United States Patent
Shen et al.

(10) Patent No.: US 11,639,227 B2
(45) Date of Patent: May 2, 2023

(54) INFLATION ASSEMBLIES FOR EVACUATION SYSTEMS

(71) Applicant: GOODRICH CORPORATION, Charlotte, NC (US)

(72) Inventors: Guangqing Shen, Tempe, AZ (US); Jeffrey Martin Werbelow, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 275 days.

(21) Appl. No.: 16/927,714

(22) Filed: Jul. 13, 2020

(65) Prior Publication Data
US 2022/0009642 A1    Jan. 13, 2022

(51) Int. Cl.
*B64D 25/14* (2006.01)
*B01J 7/00* (2006.01)
*C06D 5/04* (2006.01)

(52) U.S. Cl.
CPC ............... *B64D 25/14* (2013.01); *B01J 7/00* (2013.01); *C06D 5/04* (2013.01)

(58) Field of Classification Search
CPC ............. B64D 25/14; B01J 7/00; C06D 5/04
See application file for complete search history.

(56) References Cited

U.S. PATENT DOCUMENTS

| | | | | |
|---|---|---|---|---|
| 3,840,057 A * | 10/1974 | Lesh, Jr. | ................. | B64D 25/14 193/25 B |
| 4,115,069 A * | 9/1978 | Martin | ..................... | B01J 7/00 422/112 |
| 4,375,877 A | 3/1983 | Shorey | | |
| 4,671,744 A * | 6/1987 | Shaffer | ..................... | B63C 9/18 417/409 |
| 5,738,305 A | 4/1998 | Pruitt | | |
| 5,836,610 A * | 11/1998 | Rink | ................. | B60R 21/01526 280/736 |
| 5,851,027 A * | 12/1998 | DiGiacomo | .......... | B60R 21/272 280/736 |
| 5,863,066 A | 1/1999 | Blumenthal | | |
| 6,474,684 B1 * | 11/2002 | Ludwig | .................... | C06D 5/06 280/736 |
| 6,591,873 B1 * | 7/2003 | McNeil | ................. | F04D 19/024 141/105 |

(Continued)

FOREIGN PATENT DOCUMENTS

| EP | 39466 | 11/1981 |
|---|---|---|
| EP | 0382552 | 8/1990 |

(Continued)

OTHER PUBLICATIONS

European Patent Office, European Search Report dated Dec. 2, 2021 in Application No. 21185080.5.

*Primary Examiner* — Hai Phan
*Assistant Examiner* — Son M Tang
(74) *Attorney, Agent, or Firm* — Snell & Wilmer L.L.P.

(57) ABSTRACT

An inflation assembly for an evacuation system may comprise a manifold defining an interior volume and a plurality of inflators fluidly coupled to the manifold. Each inflator of the plurality of inflators may include a solid gas generating material and an igniter configured to ignite in response to receiving an ignite signal. The solid gas generating material may be configured to generate a gas in response to an ignition of the igniter.

14 Claims, 3 Drawing Sheets

(56) References Cited

U.S. PATENT DOCUMENTS

| | | | |
|---|---|---|---|
| 8,047,569 B2* | 11/2011 | Cox | B60R 21/264 280/736 |
| 9,637,210 B2* | 5/2017 | Thomson | F04D 17/06 |
| 2003/0034641 A1* | 2/2003 | Zimbrich | B60R 21/272 280/741 |
| 2003/0141703 A1* | 7/2003 | Fowler | B60R 21/233 280/728.2 |
| 2003/0184060 A1* | 10/2003 | Smith | B60R 21/23184 280/730.2 |
| 2004/0000617 A1* | 1/2004 | Baker | B64D 25/14 244/129.1 |
| 2004/0074696 A1* | 4/2004 | Horvath | B64D 25/14 182/48 |
| 2008/0188150 A1* | 8/2008 | Hine | B63H 19/04 440/13 |
| 2015/0005982 A1* | 1/2015 | Muthukumar | B60T 8/1725 701/1 |
| 2015/0086270 A1* | 3/2015 | Shany | E02B 15/0807 405/63 |
| 2016/0109405 A1* | 4/2016 | Cao | G01N 27/44769 95/291 |
| 2019/0009975 A1* | 1/2019 | Herr | B65D 83/68 |
| 2019/0061960 A1* | 2/2019 | McEwen | B64D 25/14 |
| 2020/0172044 A1* | 6/2020 | Yamamoto | B01J 7/00 |
| 2021/0101688 A1* | 4/2021 | Bahena | B63C 9/04 |
| 2022/0009642 A1* | 1/2022 | Shen | B01J 7/00 |

FOREIGN PATENT DOCUMENTS

| | | |
|---|---|---|
| EP | 1410987 | 4/2004 |
| EP | 3406524 | 11/2018 |

* cited by examiner

INFLATION ASSEMBLIES FOR EVACUATION SYSTEMS

FIELD

The present disclosure relates to inflation assemblies, and more specifically to inflation assemblies for evacuation systems.

BACKGROUND

Evacuation systems for aircraft typically include an inflatable device that helps passengers disembark from the aircraft in the event of an emergency or other evacuation event. The inflatable device (e.g., inflatable slide or inflatable raft) may deploy from a door sill or a side of the aircraft fuselage. The evacuation systems generally include an inflation assembly for inflating the inflatable device. The inflation assembly may include an aspirator, a pressurized cylinder, and other hardware (e.g., pressure release valves). The inflation assembly adds to the envelope size and overall weight of the evacuation system.

SUMMARY

An inflation assembly for an inflatable device is disclosed herein. In accordance with various embodiments, the inflation assembly may comprise a manifold defining an interior volume and a plurality of inflators fluidly coupled to the manifold. Each inflator of the plurality of inflators may include a solid gas generating material and an igniter configured to ignite in response to receiving an ignite signal. The solid gas generating material is configured to generate a gas in response to an ignition of the igniter.

In various embodiments, a turbine fan may be fluidly coupled to the manifold. In various embodiments, a controller may be operationally coupled to the plurality of inflators. The controller may be configured to send ignite signals to the plurality of inflators.

In various embodiments, the controller may be configured to send a first ignite signal to a first inflator of the plurality of inflators, and to send a second ignite signal to a second inflator of the plurality of inflators a predetermined time delay after sending the first ignite signal.

In various embodiments, a first sensor may be in communication with the controller. The first sensor may be configured to measure at least one of a temperature, a wind speed, or a sill height. In various embodiments, a second sensor may be in communication with the controller. The second sensor may be configured to measure a pressure of the inflatable device.

In various embodiments, the controller may be configured to determine a number of ignite signals to send to the plurality of inflators based on an output from at least one of the first sensor or the second sensor.

An evacuation system is also disclosed herein. In accordance with various embodiments, the evacuation system may comprise an inflatable device and an inflation assembly configured to inflate the inflatable device. The inflation assembly may comprise a manifold having an outlet fluidly coupled to the inflatable device and a plurality of inflators fluidly coupled to the manifold. Each inflator of the plurality of inflators may include a solid gas generating material and an igniter configured to ignite in response to receiving an ignite signal.

In various embodiments, a controller may be operationally coupled to the plurality of inflators. The controller may be configured to send ignite signals to the plurality of inflators.

In various embodiments, a controller may be operationally coupled to the plurality of inflators. The controller may be configured to send a first ignite signal to a first inflator of the plurality of inflators. The controller may be configured to send a second ignite signal to a second inflator of the plurality of inflators a predetermined time delay after sending the first ignite signal.

In various embodiments, a turbine fan may be fluidly coupled between the manifold and the inflatable device. In various embodiments, the turbine fan may be configured to deliver ambient air to the inflatable device in response to receiving fluid from the manifold.

In various embodiments, a controller may be operationally coupled to the plurality of inflators, and a pressure sensor may be operably coupled to the controller. The pressure sensor may be configured to measure a pressure within the inflatable device. In various embodiments, the controller may be configured to determine a number of ignite signals to send to the plurality of inflators based on an output from the pressure sensor.

In various embodiments, a controller may be operationally coupled to the plurality of inflators, and a sensor may be operably coupled to the controller. The sensor may be configured to measure at least one of a temperature, a wind speed, or a sill height. The controller may be configured to determine a number of ignite signals to send to the plurality of inflators based on an output from the sensor.

A system for controlling ignition of an inflation assembly for an inflatable device is also disclosed herein. In accordance with various embodiments, the system may comprise a controller and a tangible, non-transitory memory configured to communicate with the controller. The tangible, non-transitory memory has instructions stored thereon that, in response to execution by the controller, cause the controller to perform operations, which may comprise: receiving, by the controller, a deployment signal; sending, by the controller, a first ignite signal to a first inflator; and sending, by the controller, a second ignite signal to a second inflator a predetermined time delay after sending the first ignite signal. Each of the first inflator and second inflator may comprise a solid gas generating material and an igniter.

In various embodiments, the operations may further comprise: receiving, by the controller, a signal from a sensor; and determining, by the controller, a number of ignite signals to send based on the signal from the sensor.

In various embodiments, the signal from the sensor may comprise an environmental temperature measurement. The controller may send a first number of ignite signals if the environmental temperature measurement is greater than a threshold temperature and a second number of ignite signals if the environmental temperature measurement is less than or equal to the threshold temperature. The second number of ignite signals being greater than the first number of ignite signals.

In various embodiments, the signal from the sensor may comprise a pressure measurement. The controller may send a first number of ignite signals if the pressure measurement is greater than a threshold pressure and a second number of ignite signals if the pressure measurement is less than or equal to the threshold pressure. The second number of ignite signals being greater than the first number of ignite signals.

In various embodiments, the signal from the sensor may comprise a sill height measurement of the inflatable device.

The controller may send a first number of ignite signals if the sill height measurement is less than or equal to a threshold sill height and a second number of ignite signals if the sill height measurement is greater than the threshold sill height. The second number of ignite signals being greater than the first number of ignite signals.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
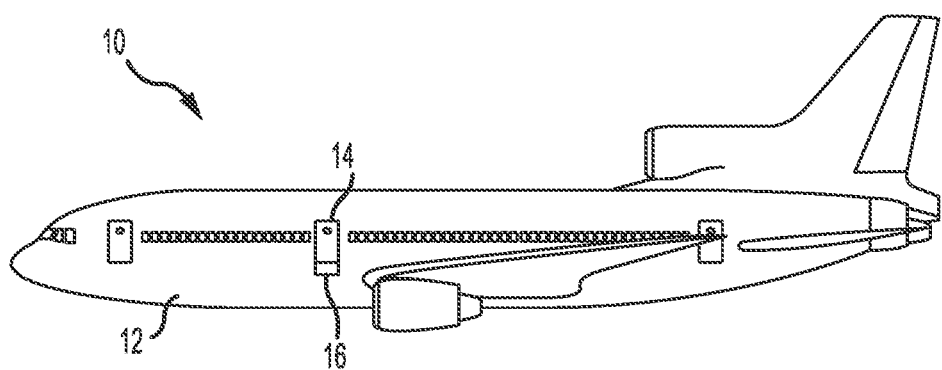
FIG. 1 illustrates an aircraft having an evacuation system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity.

System program instructions and/or controller instructions may be loaded onto a tangible, non-transitory, computer-readable medium (also referred to herein as a tangible, non-transitory memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Evacuation systems according to the present disclosure may include an inflatable device, for example, an evacuation slide or a life raft, and an inflation assembly configured to inflate the inflatable device. In accordance with various embodiments, the inflation assembly may include a series of pyrotechnic inflators fluidly coupled to a manifold. The gas from the pyrotechnic inflators may be output to a turbine fan fluidly coupled to the inflatable device. In accordance with various embodiments, the pyrotechnic inflators may be configured to fire sequentially. Ignition of the pyrotechnic inflators may be controlled to regulate a deployment of the inflatable. In accordance with various embodiments, a controller may be configured to send ignite signals to the pyrotechnic inflators using a predetermined sequence, or based on sensor readings at different environmental conditions. Evacuation systems employing pyrotechnic inflators may have a decreased size and/or reduced weight as compared to traditional evacuation systems employing a charge cylinder. Additionally, inflation systems having pyrotechnic inflators may reduce or eliminate a need for inspections of the evacuation systems and, in particular, inspections of the charge cylinder, which tends to increase time between service intervals and reduce costs.

With reference to FIG. 1, an exemplary aircraft 10 is shown, in accordance with various embodiments. Aircraft 10 may comprise a fuselage 12 having plurality of exit doors, including an exit door 14. Aircraft 10 may include one or more evacuation systems positioned near a corresponding exit door. For example, aircraft 10 includes an evacuation system 16 positioned near exit door 14. In the event of an emergency, exit door 14 may be opened by a passenger or crew member of aircraft 10. In various embodiments, evacuation system 16 may deploy in response to exit door 14 being opened or in response to another action taken by a passenger or crew member such as depression of a button, actuation of a lever, or the like.

Figure 2:
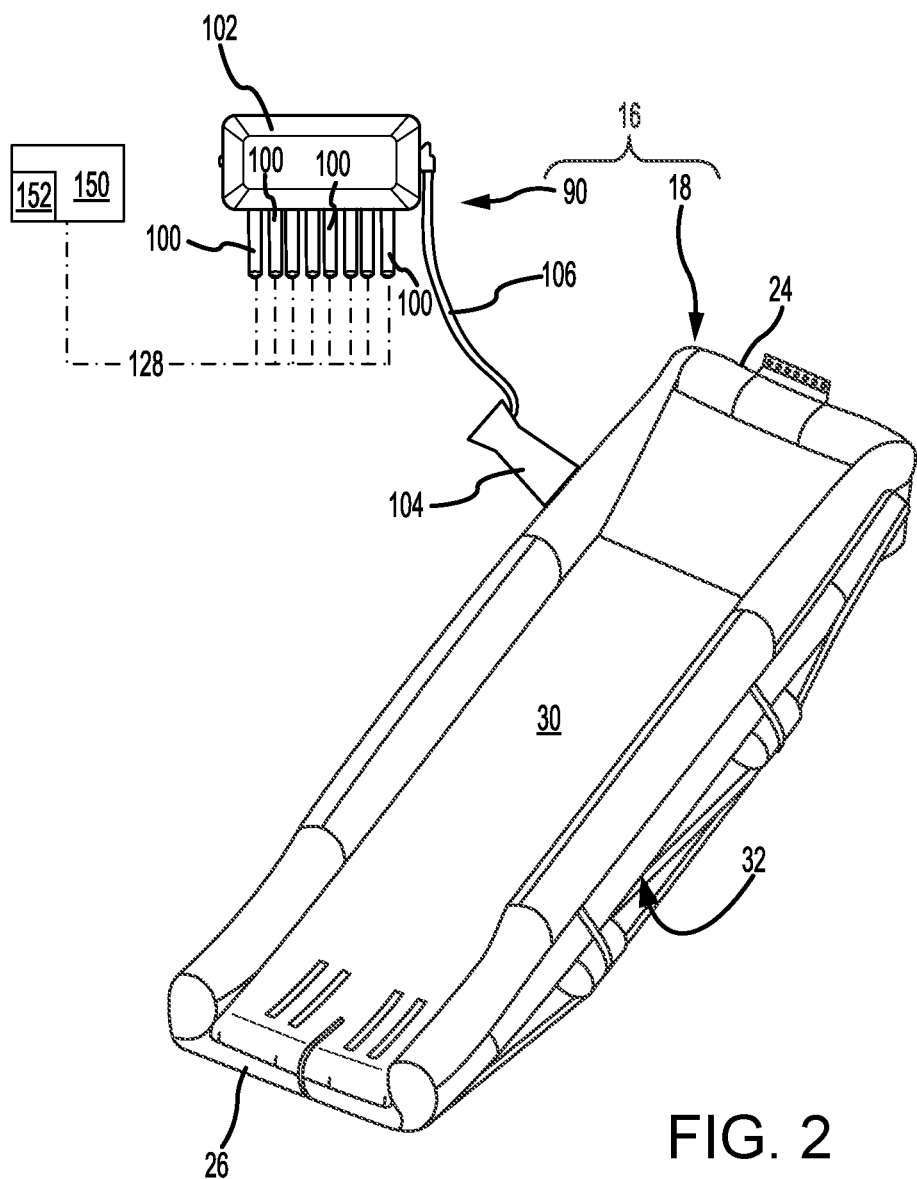
FIG. 2 illustrates a perspective view of an evacuation slide in a deployed position, in accordance with various embodiments.

With reference to FIG. 2, evacuation system 16 is illustrated in accordance with various embodiments. Evacuation system 16 includes an inflatable device 18. In various embodiments, inflatable device 18 is an evacuation slide. In FIG. 2, inflatable device 18 (referred to hereinafter as evacuation slide 18) is in the inflated, or "deployed," position. In accordance with various embodiments, evacuation slide 18 includes a head end 24 and a toe end 26 opposite head end 24. Head end 24 may be coupled to an aircraft structure (e.g., fuselage 12 in FIG. 1). In various embodiments, evacuation slide 18 may be employed as a life raft in the event of a water landing. Evacuation slide 18 includes a sliding surface 30 and an underside surface 32 opposite sliding surface 30. Sliding surface 30 extends from head end 24 to toe end 26. In response to an evacuation event (i.e., in response to deployment of evacuation slide 18), underside surface 32 may be oriented toward an exit surface, for example, toward the ground or toward a body of water. While evacuation slide 18 is illustrated as a single lane slide, it is contemplated and understood that evacuation slide 18 may include any number of lanes.

In accordance with various embodiments, evacuation system 16 further includes an inflation assembly 90. Inflation assembly 90 is configured to inflate evacuation slide 18 in response to deployment of evacuation system 16. Inflation assembly 90 includes a plurality of inflators 100 and a manifold 102. Manifold 102 is fluidly coupled to a turbine fan 104 of inflation assembly 90 via a conduit 106. Turbine fan 104 is configured to pump ambient air into evacuation slide 18 in response to receiving fluid from conduit 106. For example, turbine fan 104 may include one or more sets of impeller blades. The fluid from conduit 106 is directed in the interior and toward the impeller blades of turbine fan 104. The impeller blades rotate in response to receiving fluid from conduit 106. Rotation of the impeller blades causes one or more sets of fan blades within turbine fan 104 to rotate. Rotation of the fan blades draws ambient air into the turbine fan, the ambient air, along with the fluid from conduit 106, is output into the evacuation slide 18.

Figure 3:
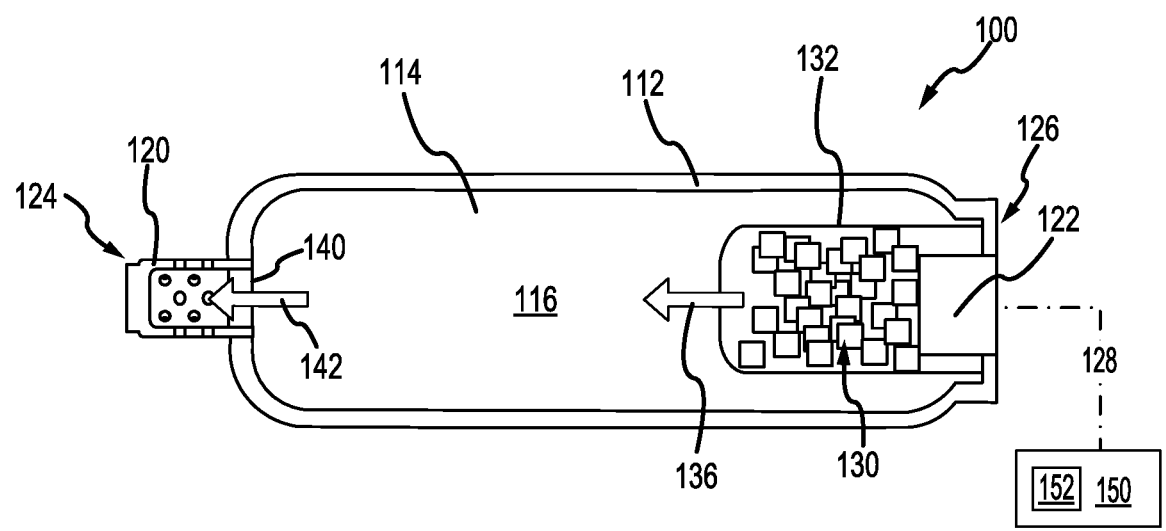
FIG. 3 illustrates an inflator for an inflation assembly, in accordance with various embodiments.

With reference to FIG. 3, a cross-section view of an inflator 100 of inflation assembly 90 is illustrated. In various embodiments, inflator 100 is a pyrotechnic inflator. In this regard, inflator 100 includes a solid gas generator material configured to produce a gas in response to ignition of an ignitor of inflator 100. In accordance with various embodiments, inflator 100 may include a housing 112 and a cylinder 114 located within housing 112. Cylinder 114 includes a pressurized gas 116. Pressurized gas 116 may be nitrogen, carbon dioxide, helium, argon, or any other suitable pressurized gas. Inflator 100 includes a nozzle 120 and an igniter 122. Nozzle 120 may be located at a first end 124 of inflator 100. Igniter 122 may be located generally at a second end 126 of inflator 100, which is opposite first end 124. Igniter 122 may be electrically coupled to a link 128. Igniter 122 is configured to ignite (i.e., fire) in response to receiving an electrical signal via link 128. A solid gas generating material 130 is located within a vessel 132 of inflator 100, proximate second end 126. Solid gas generating material 130 may comprise sodium azide ($NaN_3$), ammonium perchlorate ($NH_4ClO_4$), perchloric acid ($HClO_4$), potassium perchlorate ($KClO_4$), sodium perchlorate ($NaClO_4$), sodium chlorate ($NaClO_3$), potassium chlorate ($KClO_3$), lithium chlorate ($LiClO_3$), and/or any suitable solid gas generating material.

Solid gas generating material 130 is thermally coupled to igniter 122, such that firing, or ignition, of igniter 122 generates a chemical reaction (e.g., combustion or exothermic reduction) of solid gas generating material 130, thereby generating gas 136. Gas 136 may flow from vessel 132 into cylinder 114. Gas 136 increases a pressure within cylinder 114. The increased pressure may break a seal 140 located between cylinder 114 and nozzle 120, thereby fluidly coupling nozzle 120 and cylinder 114. In other words, in response to seal 140 breaking (or being otherwise removed from between nozzle 120 and cylinder 114), a mixture 142 of pressurized gas 116 and gas 136 flows from cylinder 114 into nozzle 120. The mixture 142 then exits inflator 100 via nozzle 120 and flows into an interior volume 148 of manifold 102, with momentary reference to FIG. 4.

Figure 4:
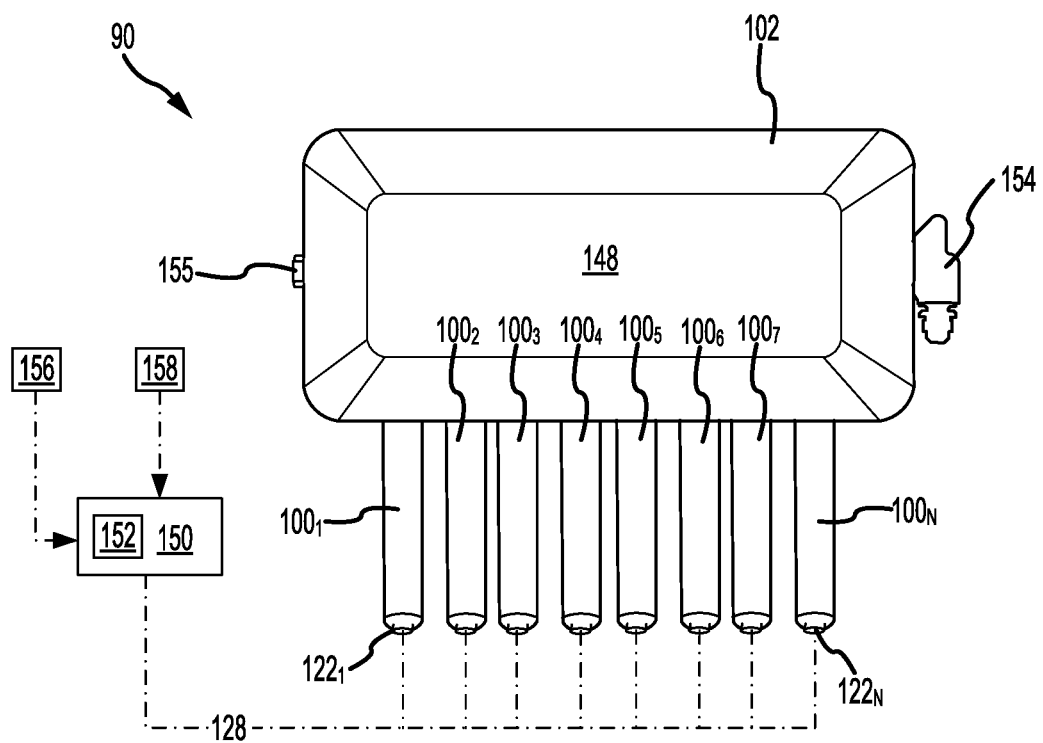
FIG. 4 illustrates an inflation assembly, in accordance with various embodiments.

With additional reference to FIG. 4, inflation assembly 90 includes a series of inflators 100, such as inflators $100_1$, $100_2$, $100_3$, . . . $100_N$ (collectively referred to as inflators 100). Inflators 100 are fluidly coupled to interior volume 148 of manifold 102. Manifold 102 includes an outlet nozzle 154. Outlet nozzle 154 fluidly couples interior volume 148 to conduit 106 (FIG. 2). In various embodiments, manifold 102 includes a pressure release valve 155. Pressure release valve 155 is configured to open in response to a pressure within interior volume 148 exceeding a threshold pressure, thereby allowing fluid to exit interior volume 148 and causing the pressure within interior volume 148 to decrease. In various embodiments, pressure release valve 155 is a burst disk, comprising a thin metallic film that is configured to burst (i.e., break) open in response to a pressure within interior volume 148 exceeding a threshold pressure.

In accordance with various embodiments, inflation assembly 90 includes a controller 150. Controller 150 is configured to control the ignition of inflators 100. In this regard, inflators 100 may be operationally coupled to controller 150. Controller 150 may be electrically coupled to inflators 100 via links 128. Links 128 may represent a wired connection, a wireless connection, a mechanical connection (e.g., a shaft, rod, lever, conduit, cord, etc.), or any other link capable of operably coupling controller 150 to the igniters 122 (FIG. 3) of inflators 100. Inflators 100, manifold 102, and controller 150 may be positioned on evacuation slide 18 or anywhere on aircraft 10. Controller 150 is configured to send electrical signals to the igniters 122 of inflators 100, thereby causing the igniters to ignite and fluid mixture 142 to flow into interior volume 148. Controller 150 is configured to send the signals to igniters 122 in response to deployment of evacuation system 16.

Controller 150 may include one or more processors and one or more tangible, non-transitory memories 152 and is capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof. Controller 150 may control the deployment of evacuation slide 18 by controlling an ignition sequence of inflators 100. For example, in various embodiments, controller 150 may control the timing of the ignite signals based on a predetermined time delay. For example, controller 150 may send a first ignite signal to inflator $100_1$ and a second ignite signal to inflator $100_2$. Controller 150 may send the second ignite signal a predetermined time delay (e.g., 0.1 seconds 0.5 seconds, 1.0 seconds, etc.) after sending the first ignite signal to inflator $100_1$. Controller 150 may send a third ignite signal to inflator $100_3$ a predetermined time delay (e.g., 0.1 seconds 0.5 seconds, 1.0 seconds, etc.) after sending the second ignite signal to inflator $100_2$.

With combined reference to FIG. 2 and FIG. 4, the time delay between ignite signals may be selected to maintain a desired pressure within interior volume 148 and/or a desired flowrate thru conduit 106. For example, the time delay may be configured such that the flowrate thru conduit 106 generates a desired rotation per minute (RPM) of the impeller and/or fan in turbine fan 104. In this regard, if the optimal, or desired, RPM of turbine fan 104 is achieved at an operating pressure of 350 pounds per square inch gauge (psig) in turbine fan 104, the timing of the ignition signals will be selected such that fluid output from each newly fired inflator 100 maintains the pressure within interior volume 148 at about 350 psig. As used in the previous context only, the term "about" means±50%. The time delay and controlled pressure may also protect the downstream components from bursting due to too high an increase in sudden pressure.

In various embodiments, controller 150 may determine how many inflators will be ignited based on environmental conditions and/or a condition of aircraft 10. In various embodiments, inflation assembly 90 includes one or more sensors 156 operably coupled to controller 150. Stated differently, sensors 156 are in communication with controller 150. Sensors 156 may be configured to measure environmental conditions. Sensors 156 may include, for example, temperature sensor(s) configured to output environmental temperature measurements to controller 150, wind speed sensor(s) configured to output windspeed measurements to controller 150, and/or sill height sensor(s) configured to output sill height measurements to controller 150. In various embodiments, sensors 156 may include sill height sensors configured to determine a sill height of exit door 14 (with momentary reference to FIG. 1) by measuring a distance between the sill of exit door 14 and an exit surface on which aircraft 10 is supported. In various embodiments, sensors 156 may include sill height sensors configured to determine a sill height of exit door 14 based on a roll and/or a pitch of aircraft 10.

In various embodiments, inflation assembly 90 may include one or more pressure sensor(s) 158 operably coupled to and in communication with controller 150. Pressure sensors 158 are configured to measure a pressure of evacuation slide 18. Pressure sensors 158 may be located at various locations along evacuation slide 18.

In accordance with various embodiments, controller 150 may be pre-implemented with multiple ignition (i.e., firing) sequence configurations. Controller 150 may choose the desired, or optimal, ignition sequence for inflators 100 based on output from sensors 156 and sensors 158. In various embodiments, controller 150 may determine a number of inflators 100 to ignite (i.e., fire) based on the measurements received from sensors 156 and sensors 158. For example, if, based on output from sensor 156, controller 150 determines the sill height measurement is less than a predetermined threshold sill height, controller 150 may ignite a first number of inflators 100 configured to inflate evacuation slide to a first length. If controller 150 determines the sill height measurement is greater than the predetermined threshold sill height, controller 150 may ignite a second, greater number of inflators configured to inflate evacuation slide 18 to a second length that is greater than the first length. In various embodiments, if, based on temperature measurements output from sensor 156, controller 150 determines the temperature measurement is greater than a threshold temperature, controller 150 may ignite fewer inflators 100 (e.g., inflators $100_1$-$100_6$), as compared to if controller 150 determines the temperature measurement is less than the threshold temperature. Controller 150 may also determine the number of inflators 100 to ignite based on pressure measurements from pressure sensors 158. For example, if the pressure measurement is greater than a predetermined threshold pressure, controller 150 may ignite a first number of inflators 100. If the pressure measurement is less than the predetermined threshold pressure, controller 150 may ignite a second, greater number of inflators. In various embodiments, controller 150 may continue sending ignite signals until a desired pressure measurement is achieved. In this regard, based on the measurements from sensors 156 and/or from pressure sensors 158, controller 150 may choose how many inflators 100 to ignite to inflate evacuation slide 18 to a desired pressure.

Controlling the amount of fluid provided to evacuation slide 18 may allow for a reduction or elimination of pressure relief valves along evacuation slide 18. Reducing the number of valves may decrease weight and/or a cost of the evacuation slide. Further, inflators 100 may be associated with longer intervals between inspection, maintenance, and overhaul as compared to charged cylinders. Longer intervals between inspection, maintenance, and overhaul tends to reduce aircraft downtime and/or decreases the costs of maintenance and replacement.

Figure 5:
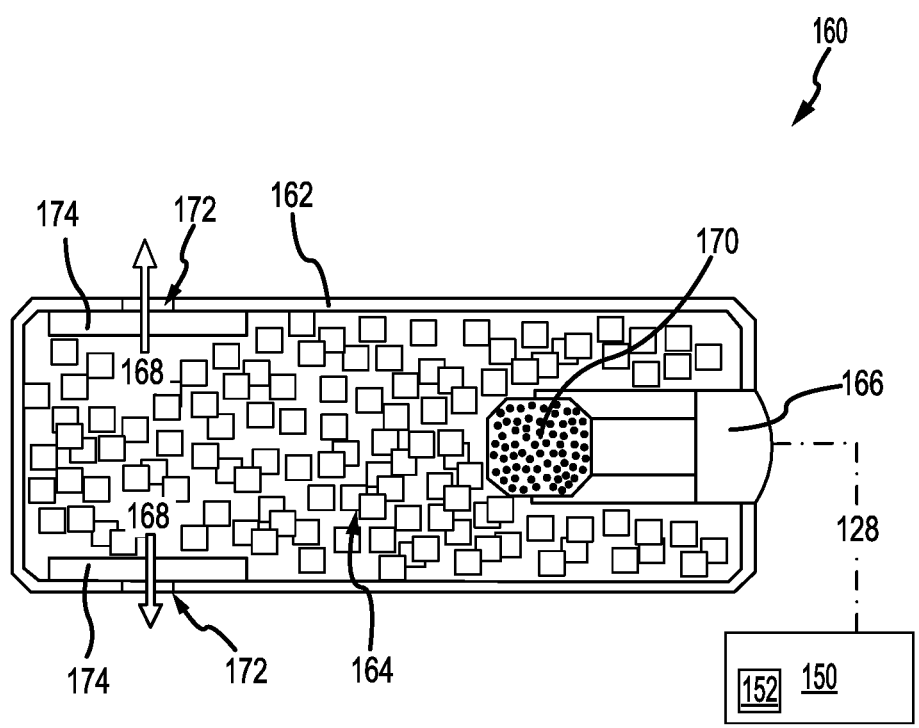
FIG. 5 illustrates an inflator for an inflation assembly, in accordance with various embodiments.

With reference to FIG. 5, an inflator 160 is illustrated. In accordance with various embodiments, inflation assembly 90, with momentary reference to FIG. 2, may include one or more inflators 160 in place of one or more inflators 100. Igniters 166 of inflators 160 may be operationally and/or electrically coupled to controller 150 via links 128. Igniter 166 may be configured to ignite (i.e., fire) in response to receiving an electrical signal (e.g., an ignite signal) from controller 150 via link 128.

In accordance with various embodiments, inflator 160 is a pyrotechnic inflator. In this regard, inflator 160 may include a solid gas generator material configured to produce a gas in response to ignition of an ignitor of inflator 160. In accordance with various embodiments, inflator 160 includes a housing 162. A solid gas generating material 164, similar to solid gas generating material 130 in FIG. 3, is located within housing 162. The solid gas generating material 164 is thermally coupled to an igniter 166. The firing, or ignition, of igniter 166 causes a chemical reaction (e.g., exothermic reduction or combustion reaction) of solid gas generating material 164, thereby generating a gas 168. In various embodiments, inflator 160 may include an enhancer 170, for example, a powder propagator, located between igniter 166 and solid gas generating material 164. In various embodiments, ignition of igniter 166 ignites enhancer 170. Ignition of enhancer 170 causes a chemical reaction (e.g., exothermic reduction or combustion reaction) of enhancer 170, which ignites solid gas generating material 164, thereby causing a chemical reaction (e.g., exothermic reduction or combustion reaction) that generates gas 168. Gas 168 may exit inflator 160 via orifices 172. In various embodiments, gas 168 may flow through a filter 174 configured to decrease a temperature of gas 168. In various embodiments, filter 174 may be located between solid gas generating material 164 and orifices 172.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflation assembly for an inflatable device, comprising:
   a manifold defining an interior volume;
   a plurality of inflators fluidly coupled to the manifold, wherein each inflator of the plurality of inflators includes:
      a solid gas generating material; and
      an igniter configured to ignite in response to receiving an ignite signal, wherein the solid gas generating material is configured to generate a gas in response to an ignition of the igniter; and
   a controller operationally coupled to the plurality of inflators, wherein the controller is configured to:
      identify a desired flowrate to maintain a fan in a turbine fan fluidly coupled to the manifold at a desired rotation per minute;
      identify a desired pressure of the interior volume of the manifold to maintain the desired flowrate;
      determine a time delay between each of a plurality of ignite signals to maintain the desired pressure of the interior volume of the manifold;
      receive an indication of a current pressure within the interior volume of the manifold; and
      send a plurality of ignite signals to the plurality of inflators, each ignite signal in the plurality of ignite signals delayed by a respective time delay based on maintaining the desired pressure of the interior volume of the manifold and the current pressure.

2. The inflation assembly of claim 1, further comprising a first sensor in communication with the controller, wherein the first sensor is configured to measure at least one of a temperature, a wind speed, or a sill height.

3. The inflation assembly of claim 2, further comprising a second sensor in communication with the controller, wherein the second sensor is configured to measure a pressure of the inflatable device.

4. The inflation assembly of claim 3, wherein the controller is further configured to determine a number of ignite signals to send to the plurality of inflators based on an output from at least one of the first sensor or the second sensor.

5. An evacuation system, comprising:
   an inflatable device;
   an inflation assembly configured to inflate the inflatable device, the inflation assembly comprising:
      a manifold defining an interior volume and having an outlet fluidly coupled to the inflatable device; and
      a plurality of inflators fluidly coupled to the manifold, wherein each inflator of the plurality of inflators includes a solid gas generating material and an igniter configured to ignite in response to receiving an ignite signal; and
   a controller operationally coupled to the plurality of inflators, wherein the controller is configured to:
      identify a desired flowrate to maintain a fan in a turbine fan fluidly coupled to the manifold at a desired rotation per minute;
      identify a desired pressure of the interior volume of the manifold to maintain the desired flowrate;
      determine a time delay between each of a plurality of ignite signals to maintain the desired pressure of the interior volume of the manifold;
      receive an indication of a current pressure within the interior volume of the manifold; and
      send a plurality of ignite signals to the plurality of inflators, each ignite signal in the plurality of ignite signals delayed by a respective time delay based on maintaining the desired pressure of the interior volume of the manifold and the current pressure.

6. The evacuation system of claim 5, wherein the turbine fan is configured to deliver ambient air to the inflatable device in response to receiving fluid from the manifold.

7. The evacuation system of claim 5, further comprising:
   a pressure sensor operably coupled to the controller and configured to measure a pressure within the inflatable device.

8. The evacuation system of claim 7, wherein the controller is further configured to determine a number of ignite signals to send to the plurality of inflators based on an output from the pressure sensor.

9. The evacuation system of claim 5, further comprising:
a sensor operably coupled to the controller and configured to measure at least one of a temperature, a wind speed, or a sill height, wherein the controller is further configured to determine a number of ignite signals to send to the plurality of inflators based on an output from the sensor.

10. A system for controlling ignition of an inflation assembly for an inflatable device, the system comprising:
a controller;
the inflation assembly comprising:
   a manifold defining an interior volume;
   a plurality of inflators fluidly coupled to the manifold; and
   a turbine fan fluidly coupled to the manifold;
a tangible, non-transitory memory configured to communicate with the controller, the tangible, non-transitory memory having instructions stored thereon that, in response to execution by the controller, cause the controller to perform operations comprising:
   identifying a desired flowrate to maintain a fan in the turbine fan fluidly at a desired rotation per minute;
   identifying a desired pressure of the interior volume of the manifold to maintain the desired flowrate;
   determining a time delay between each of a plurality of ignite signals to maintain the desired pressure of the interior volume of the manifold;
   receiving an indication of a current pressure within the interior volume of the manifold; and
   sending a plurality of ignite signals to the plurality of inflators, each ignite signal in the plurality of ignite signals delayed by a respective time delay based on maintaining the desired pressure of the interior volume of the manifold and the current pressure.

11. The system of claim 10, wherein the operations further comprise:
receiving, by the controller, a signal from a sensor; and
determining, by the controller, a number of ignite signals to send based on the signal from the sensor.

12. The system of claim 11, wherein the signal from the sensor comprises an environmental temperature measurement, and wherein the controller sends a first number of ignite signals if the environmental temperature measurement is greater than a threshold temperature and a second number of ignite signals if the environmental temperature measurement is less than or equal to the threshold temperature, the second number of ignite signals being greater than the first number of ignite signals.

13. The system of claim 11, wherein the signal from the sensor comprises a pressure measurement of the inflatable device, and wherein the controller sends a first number of ignite signals if the pressure measurement is greater than a threshold pressure and a second number of ignite signals if the pressure measurement is less than or equal to the threshold pressure, the second number of ignite signals being greater than the first number of ignite signals.

14. The system of claim 11, wherein the signal from the sensor comprises a sill height measurement, and wherein the controller sends a first number of ignite signals if the sill height measurement is less than or equal to a threshold sill height and a second number of ignite signals if the sill height measurement is greater than the threshold sill height, the second number of ignite signals being greater than the first number of ignite signals.

* * * * *